United States Patent [19]

Miyakoshi et al.

[11] 4,431,204
[45] Feb. 14, 1984

[54] FRONT WHEEL SUSPENSION SYSTEM FOR MOTORCYCLES

[75] Inventors: Shinichi Miyakoshi, Saitama; Tokio Isono, Tokyo, both of Japan

[73] Assignee: Honda Giken Kogyo Kabushiki Kaisha, Tokyo, Japan

[21] Appl. No.: 383,948

[22] Filed: Jun. 1, 1982

[51] Int. Cl.³ .............................................. B62K 21/02
[52] U.S. Cl. .................................. 280/277; 188/303; 280/279; 280/281 R; 280/286
[58] Field of Search .......................... 280/277, 278–288, 280/274–276; 188/303; 267/11 A, 12, 13, 57

[56] References Cited

U.S. PATENT DOCUMENTS 2,182,272 12/1939 Armstrong ...................... 188/303 X
2,699,845 1/1955 Brilliant ............................... 188/303
4,212,481 7/1980 Ribi ..................................... 280/276

FOREIGN PATENT DOCUMENTS

253143 6/1963 Australia .............................. 188/303
819087 6/1937 France ............................. 188/321.11
240076 9/1925 United Kingdom ................ 280/276
296288 8/1928 United Kingdom ................ 280/276

*Primary Examiner*—Joseph F. Peters, Jr.
*Assistant Examiner*—Mitchell J. Hill
*Attorney, Agent, or Firm*—Irving M. Weiner; Pamela S. Burt; John L. Shortley

[57] ABSTRACT

A front wheel suspension system for motorcycles which cooperates with a front wheel suspension including an upper fork supported by a motorcycle frame and a lower fork supporting the front wheel. The system includes a rotary lever type damper operatively coupled to the lower fork. The rotary lever type damper is disposed between a pair of side members comprising the upper fork, thus reducing unsprung weight.

1 Claim, 14 Drawing Figures

FRONT WHEEL SUSPENSION SYSTEM FOR MOTORCYCLES

BACKGROUND OF THE INVENTION

1. Field of the Invention

This invention relates to front wheel suspension systems for motorcycles and, more particularly, to a front wheel suspension system of a linkage type.

2. Description of Relevant Art

There are generally known motorcycles which have a front wheel suspension including an upper fork rotatably mounted on a head pipe secured to the front end of a frame and a lower fork supporting the front wheel and directly or indirectly coupled to a lower portion of the upper fork so that vertical displacement of the front wheel following irregular road surfaces is allowed by up-and-down swinging movement of the lower fork.

In the motorcycle having such front wheel suspension system, a cylinder type damper is provided between the upper and lower forks, and the up-and-down displacement of the front wheel is damped by damping force provided by the cylinder type damper which is elongated and contracted with the swinging of the lower fork. With the front wheel suspension system of this construction, the cylinder type damper should at least have a length corresponding to the swing stroke of the lower fork. That is, the length of the damper has to be set according to the swing stroke. In addition, substantially one half of the weight of the damper acts upon the front wheel and lower fork. Therefore, it is difficult to reduce the so-called "unsprung weight", the reduction of which is effective for improving followability characteristics and comfort. In a further aspect, oil seal members in the cylinder type damper must be pressure-bearing seal members so that they can provide seals with respect to operating fluid which is pressurized to a high pressure inside the damper when damping force is generated. Therefore, the seal force of the pressure-bearing seal members constitutes a resistance against the operation of the damper as it is elongated or contracted, thus adversely affecting the damping force characteristics.

SUMMARY OF THE INVENTION

The present invention provides a front wheel suspension system for a motorcycle, which comprises a motorcycle frame, an upper fork rotatably supported by the frame and c of a pair of side members, a lower fork supporting the front wheel at one end and coupled at the other end to the upper fork, the lower fork being capable of swinging up and down to allow vertical displacement of the front wheel following irregular road surfaces, the upper and lower forks comprising of a front wheel suspension, and a rotary lever type damper cooperating with the front wheel suspension and operatively coupled to the lower fork, the rotary lever type damper being disposed between the pair of side members. The rotary lever type damper has a case which may comprise a bottom bridge connecting together the pair of side members of the upper fork.

An object of the invention, accordingly, is to provide a front wheel suspension system for a motorcycle, in which the unsprung weight is reduced to be effective for improving followability characteristics and comfort.

Another object of the invention is to provide a front wheel suspension system for a motorcycle, which uses a damper not requiring any pressure-bearing member as an oil seal member.

A further object of the invention is to provide a front wheel suspension system for a motorcycle, in which the weight of a damper can be located at the center or substantially the center in the lateral direction of the motorcycle body so that satisfactory weight balance is obtained and the damper may be protected by the opposite side members.

The above and further objects of the invention will become more apparent from the following description of preferred embodiments thereof with reference to the accompanying drawings.

DETAILED DESCRIPTION OF THE INVENTION

Figure 1:
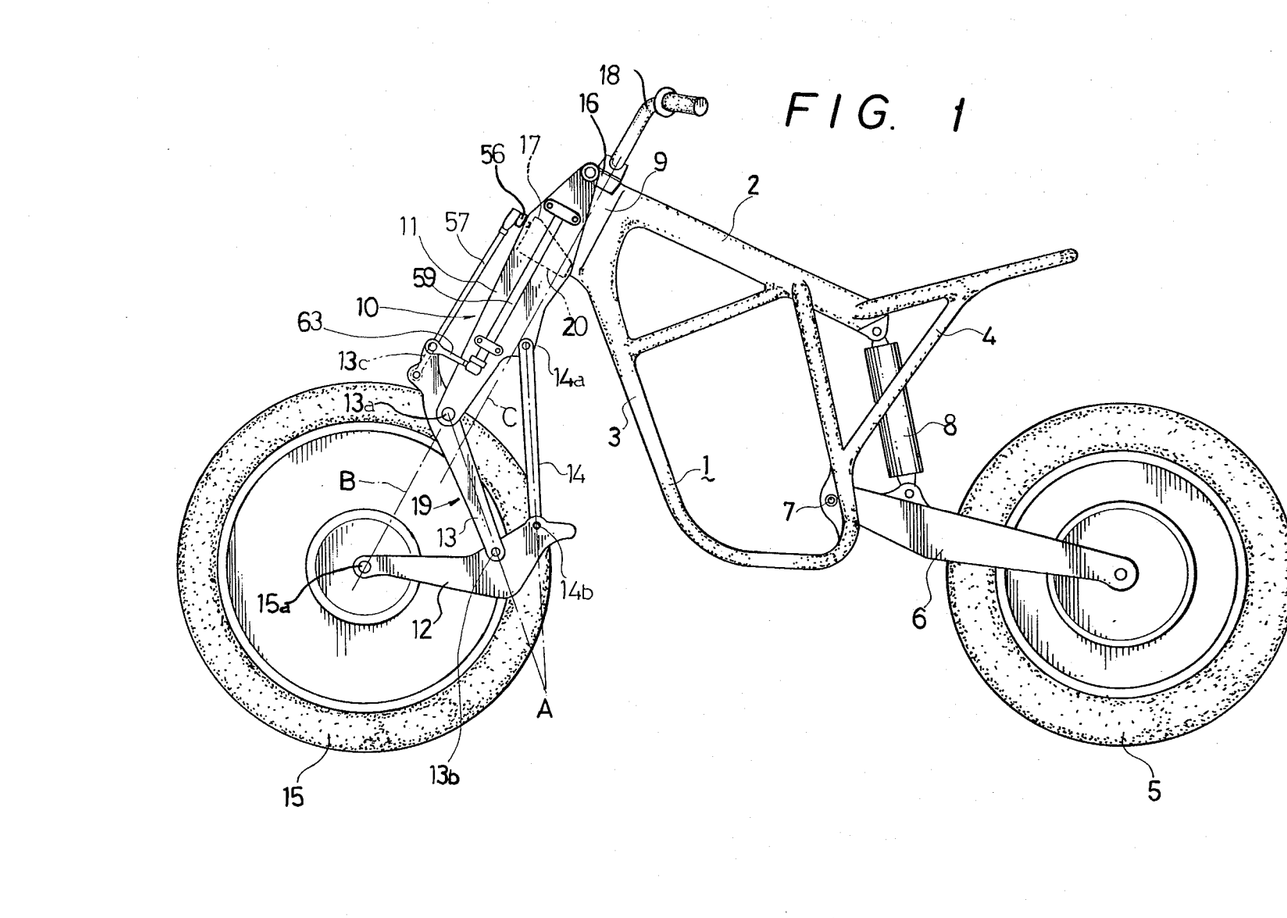
FIG. 1 is a side view showing a motorcycle provided with a linkage type front wheel suspension system embodying the invention.

FIG. 1 is a side view showing the entire construction of a motorcycle incorporating the system according to the invention. The motorcycle frame 1 generally comprises a main portion 2, a downwardly oblique tube portion 3 and a rear frame portion 4. A rear wheel 5 is supported by the rear end of a rear fork 6 which has its front end pivoted by a pivot shaft 7 to the motorcycle frame 1 and can swing up and down about the pivot shaft. Vertical displacement of the rear wheel 5 causing the swinging of the rear fork 6 is damped by a damper 8 which has its upper and lower ends connected to a rear upper portion of the motorcycle frame 1 and the rear fork 6, respectively. A head pipe 9 is secured to the front end of the motorcycle frame 1. A front wheel suspension 10 is supported on the head pipe 9 such that it can be rotated to the left and right.

Figures 2, 3:
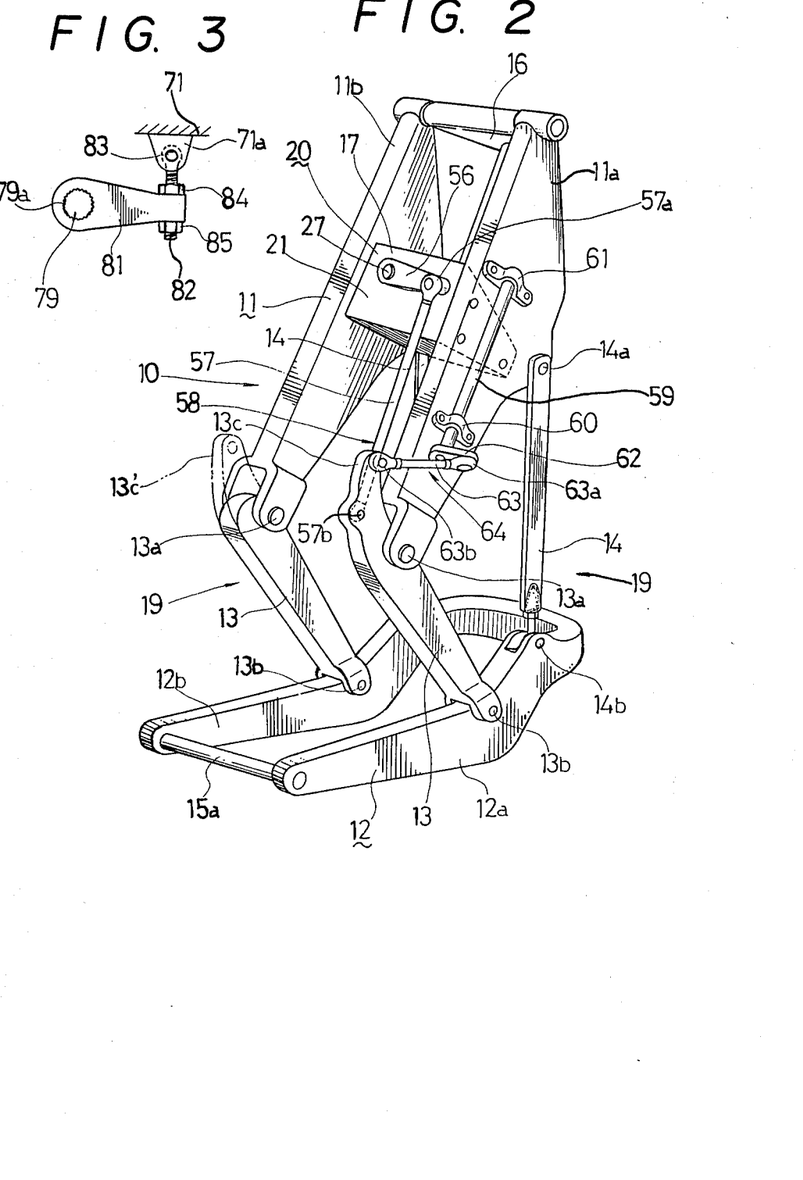
FIG. 2 is a perspective view showing the front wheel suspension system.
FIG. 3 is a plan view showing a different embodiment of the invention including means for adjusting the torsion bar pre-load.

The front wheel suspension 10 includes an upper fork 11, a lower fork 12 and front and rear arms 13 and 14 connected at the upper and lower ends thereof by pins 13a, 13b, 14a and 14b to the upper and lower forks 11 and 12, i.e., connecting both the forks 11 and 12. The axle 15a of the front wheel 15 is supported by the front end of the lower fork 12. A stem shaft extends through top and bottom bridges 16 and 17 which connect left and right members of the upper fork 11. The head pipe 9 is thus rotatable to the left and right. A handle bar 18 mounted on the top bridge 16 is operable for steering the front wheel suspension 10. The front wheel suspension 10 is constructed as a linkage with the lower fork 12 and arms 13 and 14 as movable links. As shown in FIG. 2, the front and rear arms 13 and 14 are provided for the left and right side members 11a, 11b, 12a and 12b of the upper and lower forks 11 and 12, i.e., the linkage 19 is defined on the opposite sides of the front wheel 15.

The vertical displacement of the front wheel 15 following irregular road surfaces takes place with corresponding deformation of the linkage 19 caused by rotation of the arms 13 and 14 about the pins 13a and 14a. As the linkage is deformed, the lower fork 12 which is coupled to a lower portion of the upper fork 11 via the arms 13 and 14 swings up and down with vertical displacement of the front wheel 15. The lower fork 12 thus serves as a swingable front wheel support. If the inclination angles of the arms 13 and 14 are set such that their extensions intersect at a point A in FIG. 1, the lower fork 12 swings about the point A as an instantaneous center of swing. The front wheel axle 15a can thus be displaced up and down substantially along a straight path B which is substantially parallel with the axis C of the head pipe 9, constituting the axis of steering of the front wheel suspension 10.

The vertical displacement of the front wheel 15 is damped by a rotary lever type damper 20. In this embodiment, a case 21 of the damper 20 comprises the bottom bridge 17 connecting the side members 11a and 11b of the upper fork 11. In other words, a damper mechanism is accommodated in the interior of the bottom bridge 17. This construction has various advantages in addition to being able to reduce the number of component parts by using common parts. More particularly, because the damper 20 is provided between the side members 11a and 11b, its weight is located at the center of the motorcycle body in the lateral direction thereof. Thus, satisfactory weight balance can be obtained. In another respect, the damper 20 can be protected by the side members 11a and 11b. Further, because the damper 20 is mounted in the upper fork 11 which is held stationary with respect to the vertical displacement of the front wheel, the unsprung weight on the side of the lower fork 12 can be reduced. Further, the bottom bridge 17 is formed with high rigidity sufficient to connect the side members 11a and 11b and is thus suitable for serving as the case of the damper 20 in which the operating fluid is pressurized to high pressure when damping force is generated. Further, heat generated as the operating fluid is pressurized can be radiated from the side members 11a and 11b which have large surface areas, i.e., the side members 11a and 11b can be utilized as heat radiators.

Figure 4:
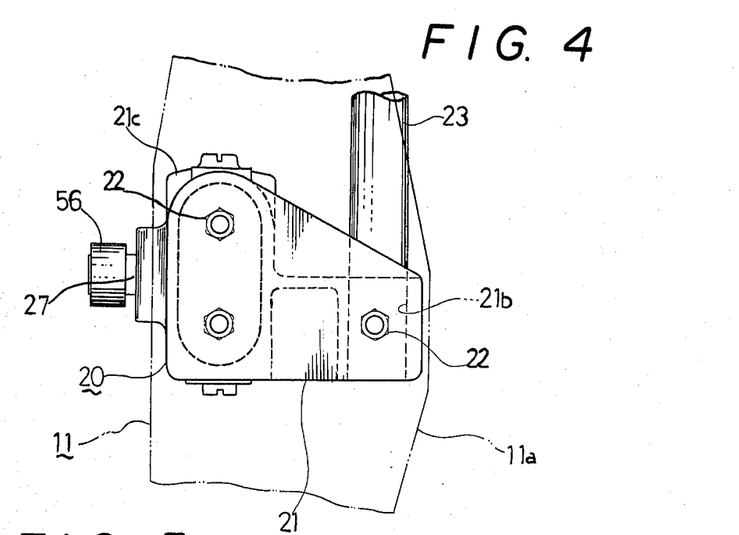
FIG. 4 is a fragmentary side view showing a damper case which also serves as a bottom bridge.
Figure 5:
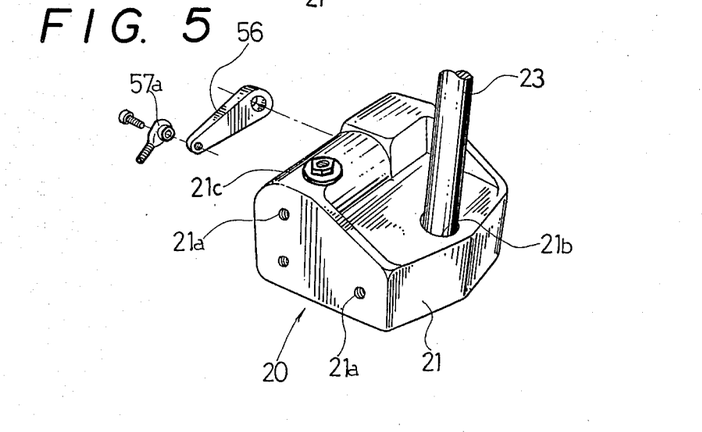
FIG. 5 is a perspective view showing the case of FIG. 4.

FIG. 5 shows the appearance of the damper case 21. The case 21 may be fabricated by casting, forging or die-casting. The side members 11a and 11b are secured to the case 21 by bolts 22 threadedly received in threaded holes 21a formed in the opposite side walls of the case 21, as shown in FIG. 4. The case 21 is formed in its rear portion with a vertical hole 21b penetrating therethrough. The stem shaft 23 mentioned above extends through the hole 21b. The case 21 has a vertically raised front portion 21c, the interior of which constitutes a chamber filled with the operating fluid.

Figure 7:
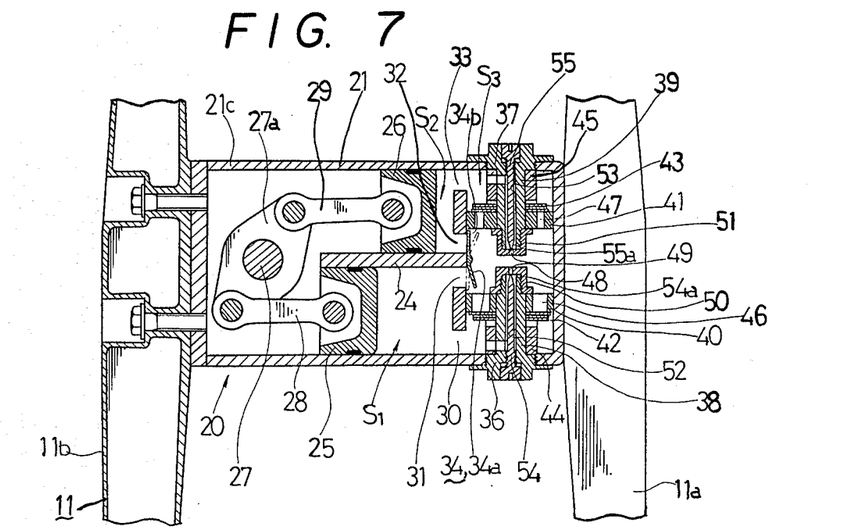
FIG. 7 is a sectional view showing the internal construction of the case in the state of FIG. 6.
Figure 8:
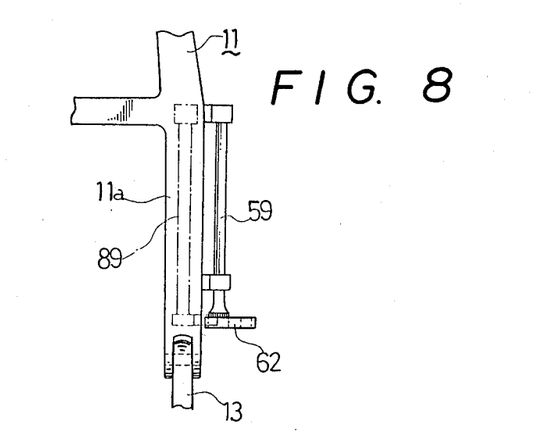
FIG. 8 is a fragmentary front view showing an embodiment of the invention in connection with the disposition of the torsion bar.

The internal consutruction of aforesaid the chamber is shown in FIG. 7. A lateral wall member 24 divides the chamber to define upper and lower chambers $S_1$ and $S_2$ in which respective pistons 25 and 26 are slidably fitted. The pistons 25 and 26 are coupled to the opposite ends of a piston arm 27a coupled to an operating shaft 27 via connecting rods 28 and 29. A damping force generating chamber $S_3$ is formed on one side of the chambers $S_1$ and $S_2$ such that it communicates with the chambers $S_1$ and $S_2$ through passages 30, 31, 32 and 33. The passages 31 and 32 are opened and closed by respective valve members 34a and 34b of a valve 34. In the damping force generating chamber $S_3$, upper and lower damping force generating means of the same construction are assembled. These means respectively comprise covers 36 and 37 secured to the case 21, cylindrical members 38 and 39 integral with the respective covers 36 and 37, plate valves 42 and 43 including disc-like members 40 and 41 fitted on the outer periphery of the cylindrical members 38 and 39 and sets of plate springs, collars 44 and 45 urging the plate valves 42 and 43 against the disc-like members 40 and 41, orifices 46 and 47 formed in the disc-like members 40 and 41 and closed by the plate valves 42 and 43, caps 50 and 51 secured to the tip of the cylindrical members 38 and 39 and formed with orifices 48 and 49, and threaded needle valves 54 and 55 extending in inner passages 52 and 53 of the cylindrical members 38 and 39 and having tapered end portions 54a and 55a adapted to occupy the orifices 48 and 49.

Figure 6:
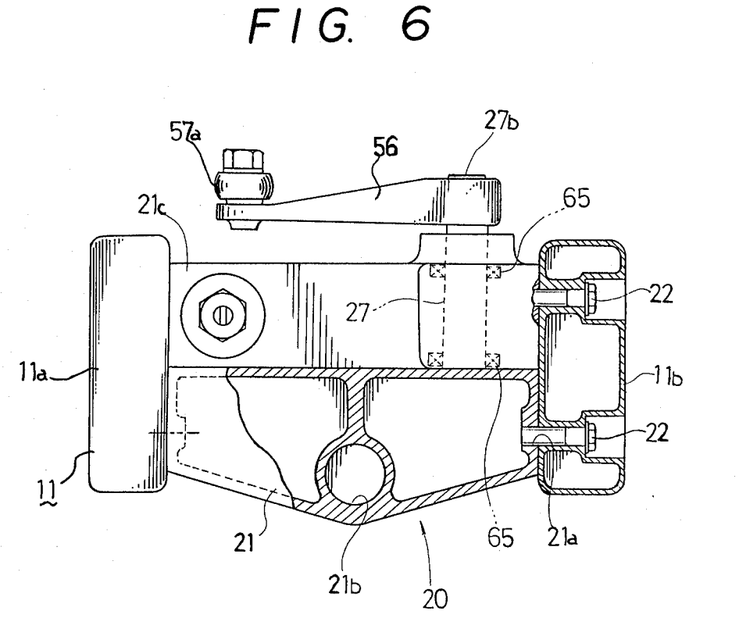
FIG. 6 is a plan view, partly in section, illustrating the coupling between the case and side members of the upper fork.

The operating shaft 27, as shown in FIG. 6, projects from the front wall of the case 21. Coupled to the projecting end 27b of the shaft 27 is a stem portion of lever arm 56 extending laterally with respect to the motorcycle body. As shown in FIG. 2, the free end of the lever arm 56 is coupled to the upper end of a rod 57 by means of a bolted joint 57a. The lower end of the rod 57 is coupled by a pin 57b to an end portion 13c of one arm 13 extending above the portion thereof coupled by the pin 13a to the upper fork 11. The rod 57 and arm 13 form a linkage 58 coupling the front wheel support lower fork 12 and the rotary lever type damper 20. A torsion bar 59 is disposed on the outer side of one side member 11a of the upper fork 11. The torsion bar 59 is rotatably supported in a bearing 60. The upper end of torsion bar 59 is secured by serration coupling to a mounting member 61, i.e., the upper end is a secured end. The lower end of the torsion bar 59 is serration coupled to the inner end of a link arm 62, which has its outer end coupled by a rod 63 to the end portion 13c of the arm 13. The coupling of the link arm 62 and rod 63 and the coupling of the arm end portion 13c and rod 63 is effected by bolted joints 63a and 63b. The link arm 62, rod 63 and arm 13 form a linkage 64 coupling the lower fork 12 and torsion bar 59. While only a single torsion bar is shown, it is possible to provide two torsion bars 59 on the opposite side members 11a and 11b by providing the other arm 13 with an end portion 13c' as shown by broken lines in FIG. 2, while providing two dampers 20 in the bottom bridge 17, thus coupling the individual arms 13 to the respective torsion bars and dampers.

When the front wheel 15 is upwardly displaced, the rod 57 is raised with rotation of the arm 13 in the counterclockwise direction about the pin 13a. Thus, the operating shaft 27 of the rotary lever type damper 20 is rotated clockwise by the lever 56. This rotation causes advancement of the piston 26 shown in FIG. 7, thus forcing out the operating fluid in the chamber $S_2$ through the passage 32 opened by the valve member 34b, orifice 48, passage 52 and passage 30 into the chamber $S_1$. At this time, the orifice 48 provides a throttling action as its aperture is reduced by the tapered portion 54a of the needle valve 54 occupying the aperture. Thus, the damper 20 generates damping force with respect to the upward displacement of the front wheel 15. The needle valve 54 is of the threaded type to permit adjustment of the aperture of the orifice 48 for adjusting the damping force. When the front wheel 15 is displaced at a high speed, the operating fluid in the chamber $S_2$ is highly pressurized. Thus, with hydraulic oil pressure acting through the orifice 46, the plate 42 valve is flexed and opened. In other words, when the front wheel 15 is displaced at a high speed, the operating fluid passes through the orifices 48 and 46. The damping force is thus generated according to the speed of displacement of the front wheel 15.

Meanwhile, with the rotation of the arm 13 in the counterclockwise direction, the torsion bar 59 is twisted via the rod 63 and link arm 62. Thus, the force which is necessary for twisting the torsion bar 59 which can provide spring force, constitutes a damping force when the front wheel 15 is upwardly displaced.

When the front wheel 15 is downwardly displaced, the arm 13 is rotated in the clockwise direction so that the rod 57, lever 56 and operating shaft 27 of the damper 20 function in the converse manner to the operation described above. Again in this case, damping force is generated by the throttling action of the orifice, the aperture of which is reduced by the tapered portion 55a of the needle valve 55. The damping force is adjusted by the thread type needle valve 55. When the front wheel 15 is downwardly displaced at a high speed, the plate valve 43 is opened so that the operating fluid passes through the orifices 49 and 47. Thus, the damping force is generated according to the displacement speed of the front wheel 15. The torsion bar 59 also releases torsional energy stored with previous upward displacement of the front wheel. Further, when the torsion bar 59 is twisted beyond the neutral position thereof, it generates a damping force with respect to the downward displacement of the front wheel 15.

In the damper 20 which operates as described above, pressure-bearing seal members 65, as shown in FIG. 6, may be provided at bearing portions of the operating shaft 27. The seal force of the seal members 65 thus does not affect the damping force of the damper as much as would be the case with a cylinder type damper.

If rod 57 of the linkage 58 coupling the lower fork 12 and damper 20 comprises a turnbuckle capable of length adjustment, the height adjustment of the motorcycle can be obtained. If the rod 63 in the linkage 64 coupling the lower fork 12 and torsion bar 59 is a turnbuckle, it is possible to make adjust of the pre-load of the spring force of the torsion bar 59. Further, the angle of the link arm 62 with respect to the torsion bar 59 may be suitably set such that the twist angle of the torsion bar 59 with unit displacement of the front wheel 15 is small, i.e., the spring force of the torsion bar 59 is low, while the displacement of the torsion bar 59 is small and the twist angle is increased, i.e., the spring force of the torsion bar 59 is increased, with increasing displacement of the front wheel 15. Thus, the damping characteristic of the torsion bar 59 can be set as a progressive characteristic.

FIG. 3 shows a different embodiment of the invention, in which the pre-load of the torsion bar is adjustable. Here, a serrated end 79a of torsion bar 79 is insertedly coupled to the stem of an adjustment arm 81. A mounting boss portion 71a of upper fork 71 is pivotally coupled by a pin 83 to one end of a threaded rod 82 extending in the lateral direction of the motorcycle body. The tip of the adjustment arm 81 is loosely fitted on the other end of the threaded rod 82. The arm 81 and threaded rod 82 are coupled together by lock nuts 84 and 85. The arm 81 may be rotated with respect to the threaded rod 82 in the direction of insertion or removal after loosening the lock nuts 84 and 85. The pre-load of the torsion bar 79 is adjusted by an amount corresponding to the rotation of the arm 81. After the adjustment, the arm 81 is locked to the threaded rod 82 by tightening the lock nuts 84 and 85.

In the embodiment of FIGS. 1 and 2, the torsion bar 59 is disposed on the outer side of the side member 11a of the upper fork 11. If the side member 11a is hollow the torsion bar 59 may be disposed in the interior of the side member 11a. Doing so improves the appearance.

Figure 9:
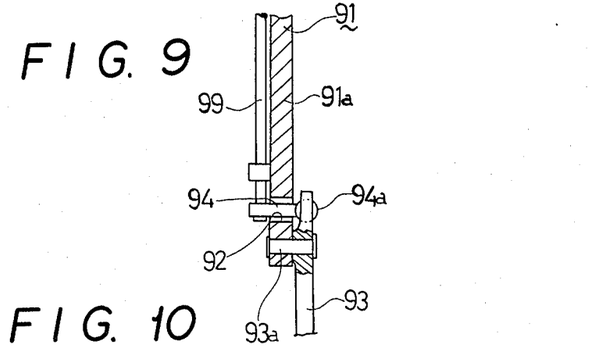
FIG. 9 is a fragmentary sectional view showing a further embodiment of the invention in connection with the disposition of the torsion bar.
Figure 10:
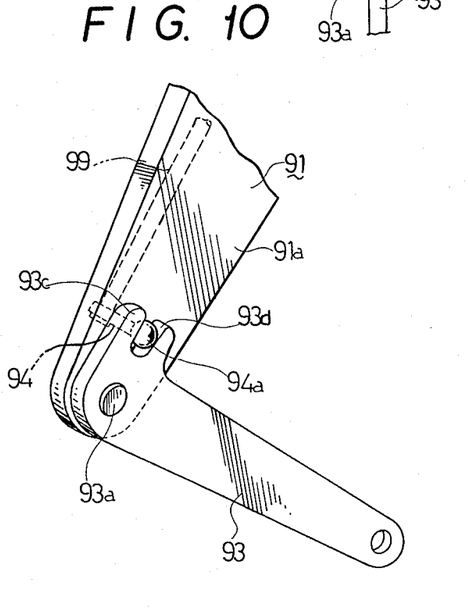
FIG. 10 is a fragmentary sectional view showing the embodiment of FIG. 9.

Further, as shown in FIG. 9, torsion bar 99 may be disposed on the inner side of side member 91a of upper fork 91. In this case, an arm 93, which is coupled by a pin 93a to the lower end of the upper fork 91, is disposed on the outer side of the side member 91a. The side member 91a is formed with a see-through hole 92 extending in the lateral direction of the motorcycle body. A link arm 94 which has its inner end coupled to the lower end of the torsion bar 99 is inserted in the hole 92. A ball 94a is mounted in the outer end of the link arm 93. As shown in FIG. 10, the arm 93 has an integral bent end portion 93a extending substantially parallel to the side member 91a from the pin 93c. A ball 94a is received in a notch 93d formed in the end portion 93c. As the arm 93 is rotated about the pin 93a for vertical displacement of the front wheel, the torsion bar 99 is twisted via the link arm 94 as in the previous embodiment. In this embodiment, only the link arm 94 may be provided between the arm 93 and torsion bar 99, and the rod 63 of the linkage 64 described above may be omitted.

Figure 11:
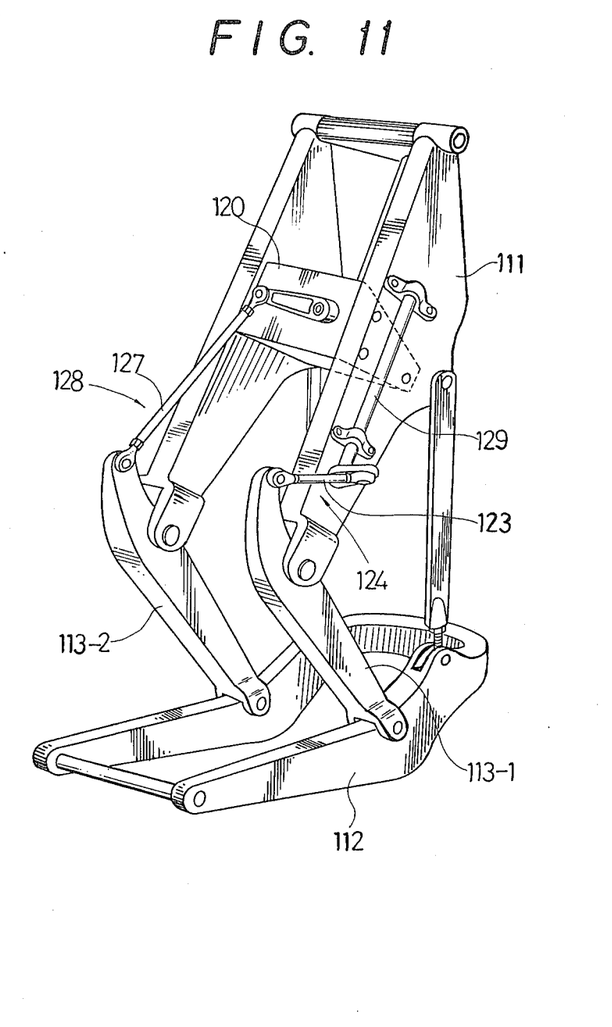
FIG. 11 is a perspective view showing a further embodiment of the invention; in which the torsion bar and damper in a linkage type front wheel suspension system are coupled to each other in a different manner.

FIG. 11 shows a further embodiment, in which rods 123 and 127 respectively coupled to a torsion bar 129 and a rotary lever type damper 120, are independently coupled to respective opposite side arms 113-1 and 113-2 connecting the upper fork 111 and lower fork 112. In this embodiment, the linkage 124 coupling the lower fork 112 and torsion bar 129 and the linkage coupling the lower fork 112 and damper 120 individually use their own arms 113-1 and 113-2. Thus, the drive force for twisting the torsion bar 129 by operating the damper 120 generating the damping force can be shared by the arms 113-1 and 113-2.

Figure 12:
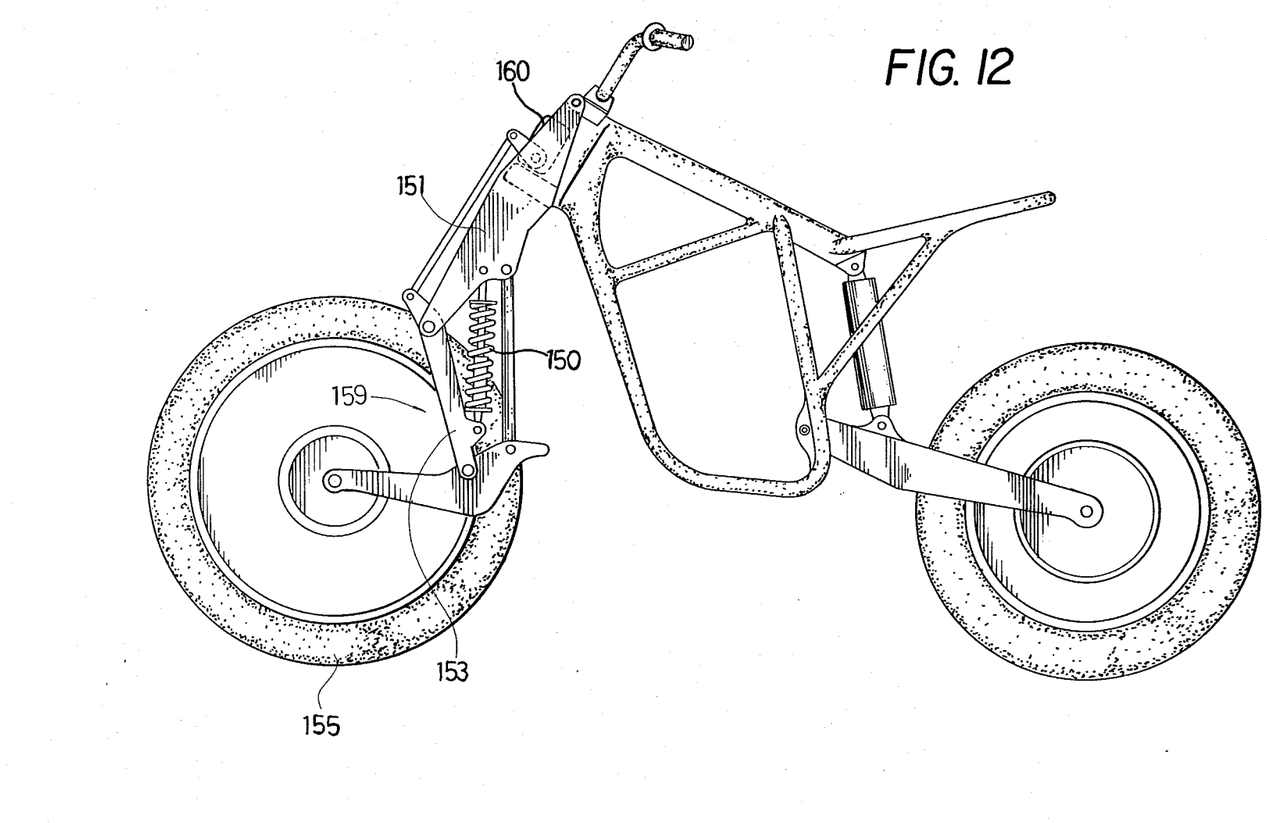
FIG. 12 is a side view showing a motorcycle using a coil spring instead of the torsion bar.

FIG. 12 shows a further embodiment of the invention, in which a coil spring is used instead of the torsion bar. The coil spring 150 is provided between a stationary link and movable link of a linkage 159, i.e. between upper fork 151 and front arms 153. In this embodiment, damping with respect to the vertical displacement of the front wheel 155 may be obtained with the combination of a rotary lever type damper 160 and coil spring 150.

Figure 13:
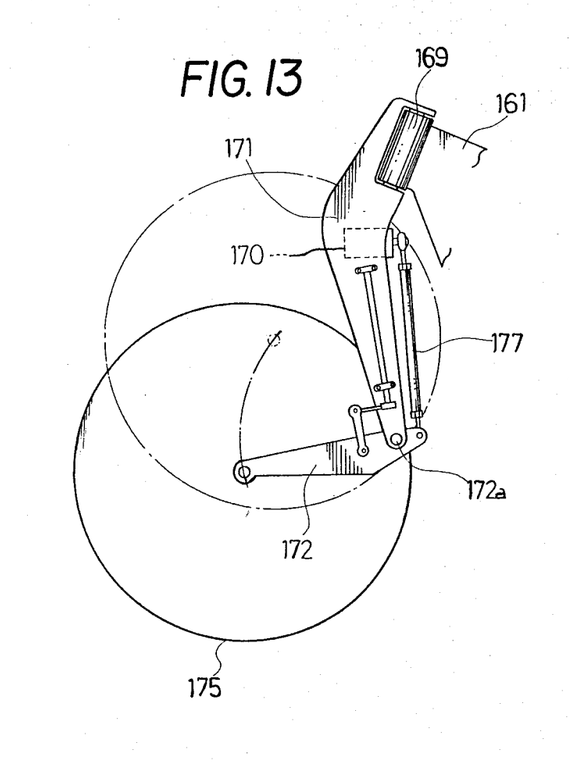
FIG. 13 is a fragmentary side view showing a further embodiment of the invention applied to a leading link type front wheel suspension system.
Figure 14:
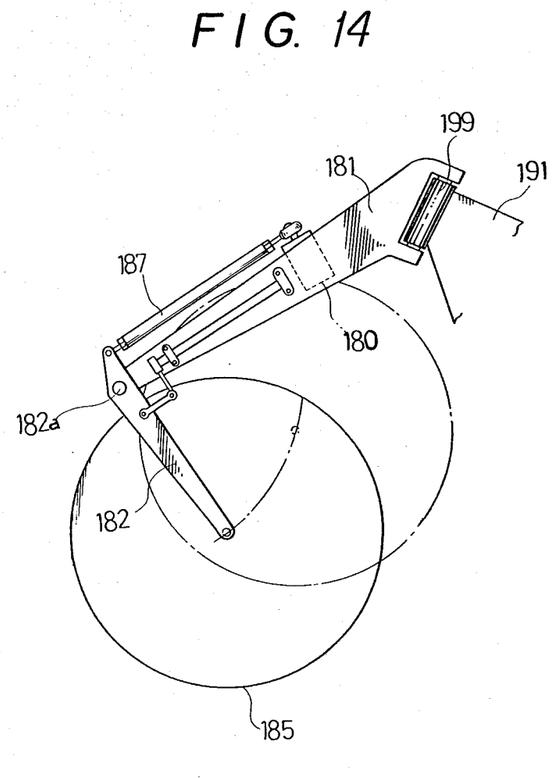
FIG. 14 is a fragmentary side view showing a further embodiment of the invention applied to a trailing link type front wheel suspension system.

In the above embodiments, the lower end portion of the upper fork and lower fork as the front wheel support member are coupled together by arms. FIGS. 13 and 14 show further embodiments of the invention, in which a pivotal front wheel support member 172 or 182 is directly coupled to the lower end of upper fork 171 or 181 rotatably mounted on head pipe 169 or 199 at the front end of the motorcycle frame 161 or 191. In the embodiment of FIG. 13, the pivotal member 172, which supports the front wheel 175 with its front end, is linked by a pin 172a to the lower end of the upper fork 171. The front wheel suspension of this embodiment is thus of a leading link type. In the embodiment of FIG. 14, the pivotal member 182, which supports the front wheel 185 with its rear end, is linked by a pin 182a to the lower end of the upper fork 181. The front wheel suspension of this embodiment is thus of a trailing link type. In either of the embodiments of FIGS. 13 and 14, the rotary lever type damper 170 or 180 is disposed between the opposite side members of the upper fork 171 or 181.

The damper 170 or 180 is coupled to the pivotal member 172 or 182 via a rod 177 or 187.

We claim:

1. A front wheel suspension system for motorcycles comprising:
   a motorcycle frame;
   an upper fork rotatably supported in said frame and comprising a pair of side members;
   a lower fork supporting a front wheel at one end and coupled at the other end to said upper fork;
   said lower fork being capable of swinging up and down to allow vertical displacement of said front wheel following irregular road surfaces;
   said upper and lower forks defining a front wheel suspension;
   a rotary lever type damper cooperating with said front wheel suspension and operatively coupled to said lower fork;
   said rotary lever type damper being disposed between said pair of side members;
   said rotary lever type damper including a case;
   said case defining a bottom bridge connecting said pair of side members of said upper fork; and
   said rotary lever type damper being housed within said case defining said bottom bridge.

* * * * *